March 30, 1926.

A. F. R. ANDERSON 1,578,700

BELT TENSIONING AND ADJUSTING APPARATUS

Filed July 27, 1925

WITNESSES
W. A. Williams

INVENTOR
Alfred F. R. Anderson.
BY
ATTORNEY

Patented Mar. 30, 1926.

1,578,700

UNITED STATES PATENT OFFICE.

ALFRED FITZ ROY ANDERSON, OF NEW YORK, N. Y.

BELT TENSIONING AND ADJUSTING APPARATUS.

Application filed July 27, 1925. Serial No. 46,213.

*To all whom it may concern:*

Be it known that I, ALFRED FITZ ROY ANDERSON, a citizen of the United States, residing at 5th Avenue and 60th Street, New York, in the county of New York and State of New York, have invented certain new and useful Improvements in Belt Tensioning and Adjusting Apparatus, of which the following is a specification.

This invention relates to a combined belt tensioning and adjusting apparatus.

The present apparatus is particularly adapted for maintaining the tension and adjustment of belts commonly employed for driving a generator from an axle of a railway car. The generator referred to is used for supplying current to the lighting system of the associated train of cars in a manner well understood.

Railway cars are supported by trucks and the generator supplying lighting current is driven from an axle of a truck. Such an axle has certain lateral movement where there is a curve in the railway track over which the associated truck is passing. Also the axles are subject to considerable vibration. The generator is usually carried by the car frame and since the car body and frame are supported upon its trucks through the medium of springs there occurs a certain upward and downward movement of the generator relative to the axle employed for driving the same.

With that heretofore recited in view, the present invention has for its object the provision of a belt adjusting and tensioning apparatus which will compensate for the relative movements between the generator and the car axle by which the same is driven and at all times maintain a positive drive between the generator and car axle.

Other objects relating to details of construction, combination and arrangement of parts, will hereinafter appear in the detail description to follow.

Figure 1:
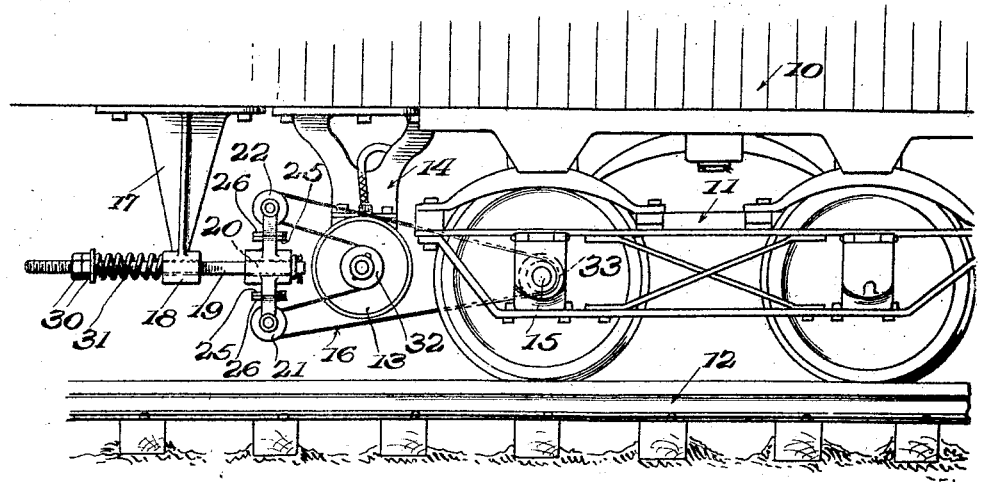
Figure 2:
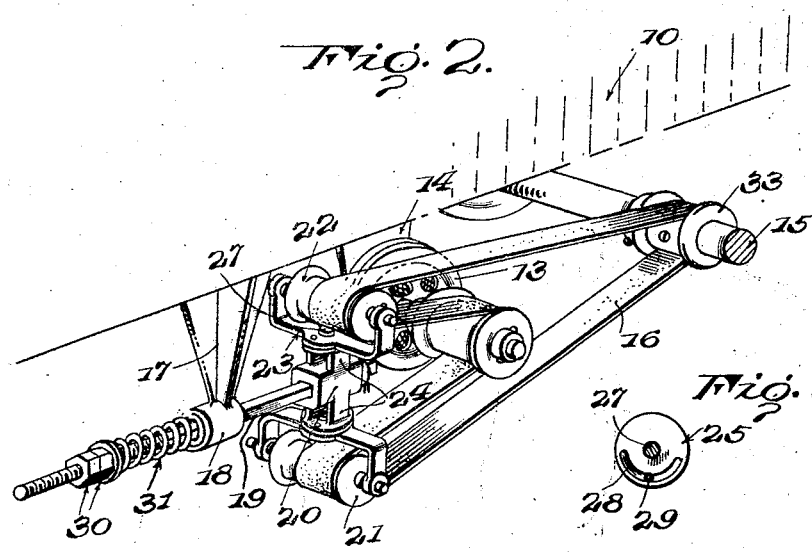
Figure 3:

The invention is illustrated by way of example in the accompanying drawings, in which:

Figure 1 is a fragmentary view in side elevation illustrating the application of my invention to a railway car, Figure 2 is a fragmentary perspective view showing more specifically the apparatus utilized in carrying out my invention, and Figure 3 is a detail view illustrating the swivel joint employed for mounting the compensating pulleys.

Referring to the drawings more particularly, 10 indicates generally the body of a railway car and 11 one of the trucks supporting said body upon the railway track indicated at 12. At 13 there is shown a generator which is supported by a suitable bracket 14, and which is driven from axle 15 through the belt 16.

In carrying out my invention, I provide a bracket 17 which may be bolted or otherwise secured to the body or frame of a railway car as shown. This bracket or support depends from the car body or frame and terminates at its lower end in a sleeve 18 which is adapted to slidingly accommodate a bar 19. The bar 19 is preferably square in cross section and has fixed upon its one end a cross-head 20. The cross-head 20 supports the two pulleys 21 and 22 which are preferably of the construction shown. Each pulley is swiveled to the head 20 through the means of a U-shaped journal member 23 and a protruding frame member 24 formed integrally with the cross-head 20. The frame members 24 are disposed upon opposite sides of the cross-head 20, and each frame member is formed with a circular plate portion 25. The bridge portion of each U-shaped member is formed with an enlargement 26 which, in each instance, is adapted to seat upon the portion 25 of the associated frame member 24.

A suitable bolt or rivet 27 is employed for pivotally connecting each U-shaped member 23 with its associated frame member 24 as best illustrated in Figure 2. Each frame portion 25 is provided with an arcurate slot 28 (Figure 3) in which there is disposed a detent 29 carried by the enlargement 26 of the associated U-shaped member 23, and thus permitting limited pivotal movement of the U-shaped members in either direction.

The end of bar 19 opposite to that carrying cross-head 20 is threaded as shown, and carries a pair of lock nuts 30. Between the lock nuts 30 and sleeve 18 there is interposed a suitable compression spring 31.

The generator 13 has its armature shaft extended, and said extended shaft has fixed thereon a pulley 32. Upon axle 15 there is fixed a similar pulley 33. The belt 16 is trained about pulley or sheave 32 and the tensioning pulleys 21 and 22; and the portion of the belt occurring between pulleys 21 and 22 is trained about the generator or driven pulley 32. By arranging the pulleys 21 and 22 at the rear of the generator the same maintain a constant tension upon the belt for holding the same upon pulleys or sheaves 32 and 33. The belt 16 is preferably of the width shown and maintains the pulleys 21 and 22 in the position shown. Should there occur a curve in the track over which the truck 11 is passing, the axle 15 and pulley 33 will move laterally and the pulleys 21 and 22 will shift correspondingly. I construct the pulleys 21 and 22 with a belt surface slightly greater in width than the width of belt 16 and thus allow slight pivotal movement of these pulleys without binding the belt. It is believed it is entirely clear and apparent from the description heretofore given of my apparatus that the same will operate to maintain the belt tensioned upon the driven pulley 32 and driving pulley 33 at all times and under the different operating conditions incident to the combination of elements or devices described. It should be noted that the tension of belt 16 can be adjusted quickly and easily by manipulation of the lock nuts 30. If it is desired to obtain considerable slack in the belt, the nuts 30 should be manipulated to permit the belt to be removed from pulley 32. The belt can then be easily removed from the car axle pulley 33, and shifted out of the way in case it is desired to repair the truck 11 such as replacement of its wheels which is often necessary.

While I have shown the preferred form and construction of my belt tensioning and adjusting apparatus, it is to be understood I am aware of the fact that changes might be made without departing from the spirit of my invention as indicated by the appended claims.

I claim:

1. In combination, a railway car having a supporting truck, a pair of belt tensioning pulleys carried by the car and located at the rear of an axle of said truck, a drive belt trained about the axle and each of the tensioning pulleys, and a driven pulley located between the tensioning pulley and axle, and the portion of the belt occurring between the tensioning pulleys trained about said driven pulley.

2. In combination, a railway car having a supporting truck, a pair of belt tensioning pulleys supported by the car at a point rearward of an axle of said truck, said belt tensioning pulleys being arranged one above the other, a belt trained about the car axle and each of the tensioning pulleys, and a driven pulley arranged between the axle and tensioning pulleys, and the portion of belt occurring between the tensioning pulleys trained about said driven pulley.

3. In combination, a railway car having a supporting truck, a pair of belt tensioning pulleys supported by the car and located at the rear of an axle of said truck, means to permit pivotal movement of the tensioning pulleys, a drive belt trained about the axle and each of the tensioning pulleys, and a driven pulley arranged between the axle and tensioning pulleys, and the portion of belt occurring between the tensioning pulleys trained about said driven pulley.

4. In combination, a railway car having a supporting truck, a pair of belt tensioning pulleys supported by the car at a point rearward of an axle of said truck, means to permit limited pivotal movement of the tensioning pulleys, and a belt trained about the axle and each of the tensioning pulleys, a driven pulley supported by the car at a point between the tensioning pulleys and the axle, and the portion of the belt occurring between the tensioning pulleys trained about said driven pulley.

5. In combination, a railway car having a supporting truck, a pair of belt tensioning pulleys supported for pivotal movement and located at the rear of the axle, a belt trained about the axle and each of the tensioning pulleys, said tensioning pulleys having a belt contacting surface of greater width than the belt, and a driven pulley supported by the car at a point intermediate the axle and tensioning pulleys and having the portion of belt occurring between the tensioning pulleys trained thereabout.

6. In combination, a railway car having a truck, a bar arranged longitudinally of the car, and supported therebeneath for longitudinal movement, a pair of pulleys carried by the bar, a belt trained about the car axle and about each of the pulleys, a driven pulley intermediate the axle and pair of pulleys, and the portion of belt extending between the pair of pulleys trained about the driven pulley, and means for pressing the bar in a direction away from the car axle, said means being capable of allowing the bar sufficient movement toward the axle to remove the belt from the driven pulley.

7. In combination, a railway car having a supporting truck, a bracket depending from the car and at the rear of an axle of the truck, a bar arranged longitudinally of the car and slidingly supported by the bracket, a pair of pulleys swivelled upon the forward end of the bar, a belt trained about the axle and each of the pair of pulleys, a driven pulley intermediate the pair of pulleys and the axle, and the portion of belt occurring between the pair of pulleys trained thereabout, and a compression spring encircling the bar and adapted to urge the bar away from the axle.

8. In combination, a railway car having a supporting truck, a bracket depending from the car and at the rear of an axle of the truck, a bar arranged longitudinally of the car and slidingly supported by the bracket, a pair of pulleys swivelled upon the forward end of the bar, a belt trained about the axle and each of the pair of pulleys, a driven pulley intermediate the pair of pulleys and the axle, and the portion of belt occurring between the pair of pulleys trained thereabout, a compression spring encircling the bar and adapted to urge the same in a direction away from the axle, and means whereby the tension of said spring may be adjusted.

In testimony whereof I affix my signature.

ALFRED FITZ ROY ANDERSON.